(12) United States Patent
Jacobs et al.

(10) Patent No.: US 7,288,314 B2
(45) Date of Patent: Oct. 30, 2007

(54) PROCESS FOR THE MANUFACTURE OF A BALLISTIC-RESISTANT MOULDED ARTICLE

(75) Inventors: Martinus Johannes Nicolaas Jacobs, Heerlen (NL); Jean Hubert Marie Beugels, Landgraaf (NL); Marc Blaauw, Rijswijk (NL)

(73) Assignee: DSM IP Assets B.V., Te Heerlen (NL)

( * ) Notice: Subject to any disclaimer, the term of this patent is extended or adjusted under 35 U.S.C. 154(b) by 0 days.

(21) Appl. No.: 10/532,807

(22) PCT Filed: Oct. 31, 2003

(86) PCT No.: PCT/NL03/00755

§ 371 (c)(1), (2), (4) Date: Jul. 19, 2005

(87) PCT Pub. No.: WO2004/039565

PCT Pub. Date: May 13, 2004

(65) Prior Publication Data

US 2006/0051564 A1    Mar. 9, 2006

(30) Foreign Application Priority Data

Nov. 1, 2002    (NL) .................................. 1021805

(51) Int. Cl.
B32B 18/00    (2006.01)
B32B 27/04    (2006.01)
B29C 70/44    (2006.01)

(52) U.S. Cl. .............................. 428/299.1; 428/298.1; 428/911; 264/258

(58) Field of Classification Search ............... 428/113, 428/286, 911, 300.7, 299.7, 289.1; 442/366; 264/258; 156/307.1, 307.3
See application file for complete search history.

(56) References Cited

U.S. PATENT DOCUMENTS

| 3,743,461 | A | * | 7/1973 | Williams | .................... | 425/148 |
|---|---|---|---|---|---|---|
| 4,457,985 | A |   | 7/1984 | Harpell et al. | | |
| 4,916,000 | A | * | 4/1990 | Li et al. | ..................... | 428/105 |
| 4,953,234 | A | * | 9/1990 | Li et al. | ........................ | 2/412 |
| 5,124,195 | A | * | 6/1992 | Harpell et al. | .............. | 428/152 |
| 5,935,678 | A | * | 8/1999 | Park | .......................... | 428/105 |
| 6,562,435 | B1 | * | 5/2003 | Brillhart, III et al. | ....... | 428/105 |
| 6,610,617 | B2 | * | 8/2003 | Chiou | ........................ | 442/203 |
| 6,825,137 | B2 | * | 11/2004 | Fu et al. | ..................... | 442/135 |
| 6,862,971 | B2 | * | 3/2005 | Ramkumar | ................ | 89/36.02 |
| 6,890,638 | B2 | * | 5/2005 | Nguyen et al. | .......... | 428/301.1 |
| 6,949,280 | B2 | * | 9/2005 | Brillhart et al. | ............ | 428/105 |
| 7,148,162 | B2 | * | 12/2006 | Park et al. | ................... | 442/134 |

FOREIGN PATENT DOCUMENTS

| EP | 0 116 845 | A2 |   | 8/1984 |
|---|---|---|---|---|
| EP | 0 645 415 | A1 |   | 3/1995 |
| WO | WO97/00766 |   | * | 1/1997 |
| WO | WO 97/00766 |   |   | 1/1997 |
| WO | WO 002/29468 |   |   | 5/2000 |

OTHER PUBLICATIONS

"Jane's Ammunition Handbook", Edited by Terry J. Gander and Charles Q. Cutshaw, Ninth Edition 2000-2001, four pages. Date 2000.

* cited by examiner

*Primary Examiner*—N. Edwards
(74) *Attorney, Agent, or Firm*—Nixon & Vanderhye PC

(57) ABSTRACT

The invention relates to a process for the manufacture of a ballistic-resistant moulded article in which a stack of monolayers is formed, each monolayer containing unidirectionally oriented reinforcing fibres and at most 30 mass % of a plastic matrix material, the reinforcing fibres being highly-drawn polyethylene fibres, and with the fibre direction in each monolayer being rotated with respect to the fibre direction in an adjacent monolayer, the stack then being compressed at a pressure of more than 25 MPa and a temperature between 125 and 150° C., and the plastic matrix material having a 100% modulus of at least 3 MPa.

5 Claims, No Drawings

PROCESS FOR THE MANUFACTURE OF A BALLISTIC-RESISTANT MOULDED ARTICLE

This application is the U.S. national phase of international application PCT/NL2003/000755 filed 31 Oct. 2003 which designated the U.S. and claims benefit of NL 1021805, dated 1 Nov. 2002, the entire content of which is hereby incorporated by reference.

The invention relates to a process for the manufacture of a ballistic-resistant moulded article in which a stack of monolayers is formed, each monolayer containing unidirectionally oriented reinforcing fibres and at most 30 mass % of a plastic matrix material, the reinforcing fibres being highly-drawn polyethylene fibres, and with the fibre direction in each monolayer being rotated with respect to the fibre direction in an adjacent monolayer, the stack then being compressed at elevated temperature at a given pressure.

Such a process is known from EP 0833742 A1. EP 0833742 A1 discloses a process for the manufacture of a ballistic-resistant moulded article in which a stack is made of monolayers, each monolayer containing unidirectionally oriented reinforcing fibres and at most 30 mass % of a styrene-isoprene-styrene triblock copolymer, the reinforcing fibres being highly-drawn polyethylene fibres, and with the fibre direction in each monolayer being rotated with respect to the fibre direction in an adjacent monolayer, the stack then being compressed at a temperature between 115 and 125° C. and a pressure of at most 16.5 MPa. Since ballistic protective panels or equipment is often stored, or used, at temperatures above ambient conditions, for instance when applied in vehicles, the ballistic protection must be guaranteed also at higher temperatures.

A drawback of the known process is that the specific energy absorption (SEA) for rifle bullets, such as AK47, SS109 or 7.62 NATO Ball, of a moulded article manufactured by it is significantly lower at 80° C. than at room temperature, so that the protection afforded is in many cases inadequate. The SEA is understood to be the energy absorption upon impact of a bullet hitting the moulded article at such a velocity that the probability of the moulded article stopping the bullet is 50% ($V_{50}$), divided by the areal density (mass per $m^2$) of the moulded article.

The object of the invention is to provide a process providing moulded articles that do not have the aforementioned drawback or have the aforementioned drawback to a lesser extent.

This object is achieved by the plastic matrix material having a modulus of at least 3 MPa and the stack being compressed at a pressure of more than 25 MPa and a temperature between 125 and 150° C.

The process according to the invention can be used for the manufacture of moulded articles, which with high specific energy absorption at 80° C., so that good ballistic protection is afforded.

In the field of layered ballistic-resistant structures high specific energy absorption against AK47 bullets is generally understood to correspond to a SEA of more than 100 $Jm^2/kg$. The SEA of the moulded article manufactured with the process according to the invention is preferably higher than 120 $Jm^2/kg$ and more preferably higher than 140 $Jm^2/kg$.

Here and hereafter good ballistic properties are understood to be in particular a high SEA against rifle bullets such as AK47, SS109 and 7.62 NATO Ball.

The advantage of a high SEA is that fragments having a given velocity can be stopped by a layered article having a substantially lower areal mass. The areal mass indicates the mass per $m^2$ of surface of the article, and is also referred to as areal density). A low areal mass is very important for increasing the wearing comfort, which together with good protection is the main objective when developing new materials in ballistic-resistant clothing. A reduction in mass is also of advantage in case of e.g. vehicle or helicopter armouring.

Within the context of the present application monolayer means a layer of substantially parallel reinforcing fibres embedded in a plastic matrix material. The term matrix material means a material, which holds the fibres together and which wholly or partially encapsulates the fibres. Such monolayers (also called prepregs by one skilled in the art) and the methods of obtaining such a monolayer are disclosed in for instance EP 191306 and WO 95/00318 A1. A monolayer may be obtained by orienting a plurality of fibres in coplanar and parallel fashion in one plane, for instance by pulling a number of fibres or yarns from a fibre bobbin frame over a comb, and impregnating the fibres with the plastic matrix material in a known way before, during or after orienting. In this process, fibres may be used that have previously been coated with a polymer other than the plastic matrix material in order to, for instance, protect the fibres during handling or in order to obtain better adhesion of the fibres onto the plastic of the monolayer. Preferably, uncoated fibres are used.

The plastic matrix material in the process according to the invention has a 100% modulus of at least 3 MPa. This is understood to be a secant modulus measured according to ISO 527 at a strain of 100%.

Suitable matrix materials include thermoplastic and thermosetting materials. Preferably, thermoplastics are applied as matrix material, and particularly suitable are those matrices that can be applied as a dispersion in water. Examples of suitable polymer materials include: acrylates, polyurethanes, modified polyolefins and ethylene vinyl acetate. Preferably, the matrix material contains a polyurethane. More preferably, the polyurethane is a polyetherurethane; that is based on a polyetherdiol, since that provides good performance over a wide temperature range. In a special embodiment, the polyurethane or polyetherurethane is based on aliphatic diisocyanates as this further improves product performance, including its colour stability.

The 100% modulus of the plastic matrix material is at least 3 MPa. Preferably the 100% modulus is at least 5 MPa. The 100% modulus is generally lower than 500 MPa.

Impregnation of the reinforcing fibres with the plastic matrix material can for instance be effected by applying one or more films of the plastic to the top, bottom or both sides of the plane of the fibres and then passing these, together with the fibres, through heated pressure rolls. Preferably, however, the fibres, after being oriented in parallel fashion in one plane, are coated with an amount of a liquid substance containing the plastic matrix material of the monolayer. The advantage of this is that more rapid and better impregnation of the fibres is achieved. The liquid substance may be for example a solution, a dispersion or a melt of the plastic. If a solution or a dispersion of the plastic is used in the manufacture of the monolayer, the process also comprises evaporating the solvent or dispersant.

In the process according to the invention the stack is compressed at a pressure of more than 25 MPa, in a press or compression-moulding machine. Preferably, the pressure is at least 27, or at least 29 MPa since this further enhances performance of the moulded article. The temperature during the compression is between 125 and 150° C. A higher temperature has the advantage that the time of compression can be reduced, but the temperature should not exceed 150° C., that is remain below the melting range of the polyethylene fibres. In a preferred embodiment, the stack preferably comprising a polyurethane matrix material, is compressed for at least 60 minutes at a temperature between 125 and 135° C., or even more preferred for 20 minutes at a temperature between 135 and 150° C.

After pressing at elevated temperature, the stack is cooled before removing from the press to a temperature below 100° C., preferably below 80° C. In a preferred embodiment, the stack is cooled while still under pressure, preferably of at least 5 MPa, more preferably under the same pressure as in the preceding pressing step.

The fibre direction in each monolayer in the ballistic-resistant moulded article prepared according to the process according to the invention is rotated with respect to the fibre direction in an adjacent monolayer. Good results are achieved when this rotation amounts to at least 45 degrees. Preferably, this rotation amounts to approximately 90 degrees. Such construction is hereafter referred to as being "cross-layered".

Reinforcing fibre here means an elongate body whose length dimension is greater than the transverse dimensions of width and thickness. The term reinforcing fibre includes a monofilament, a multifilament yarn, a tape, a strip, a thread, a staple fibre yarn and other elongate objects having a regular or irregular cross-section.

Preferably, the reinforcing fibres predominantly contain highly-drawn fibres of high molar mass linear polyethylene. High molar mass is understood to be a molar mass of at least 400,000 g/mol.

Linear polyethylene is here understood to be polyethylene with less than one side chain per 100 carbon atoms and preferably less than one side chain per 300 carbon atoms; a side chain, also called branch, containing at least 10 carbon atoms. In addition the polyethylene may contain up to 5 mol % of one of more other alkenes which are copolymerizable therewith, such as propylene, butene, pentene, 4-methylpentene, octene.

Preferably, use is made of highly-drawn polyethylene fibres comprising polyethylene filaments prepared by a gel spinning process as described in for example GB 2042414 A, GB 2051667 A, or WO01/73173 A1. This process essentially comprises the preparation of a solution of a polyolefin of high intrinsic viscosity, spinning the solution into filaments at a temperature above the dissolving temperature, cooling down the filaments to below the gelling temperature so that gelling occurs and drawing the filaments before, during or after removal of the solvent. The shape of the cross-section of the filaments can be chosen through selection of the shape of the spinning aperture.

Preferably, the monolayer contains strong polyethylene fibres, with a denier per filament (dpf) greater than or equal to 0.5 dpf. Most preferably, use is made of multifilament yarns of ultra-high molar mass linear polyethylene with an intrinsic viscosity of at least 5 dl/g, determined in decalin at 135° C., and a yarn titre of at least 50 denier, which yarn has a tensile strength of at least 35 cN/dtex and a tensile modulus of at least 1000 cN/dtex and with the filaments having a cross-section aspect ratio of at most 3. The use of these fibres has been found to improve the high level of protection of the ballistic-resistant moulded article manufactured according to the process of the invention still further.

In the process according to the invention the stack may be made starting from separate monolayers. Separate monolayers are difficult to handle, however, in that they easily tear in the fibre direction. It is therefore preferred to make the stack from consolidated monolayer packages containing from 2 to 8, as a rule 2, 4 or 8, monolayers that are placed at an angle with respect to the fibre direction, e.g. cross-wise. Consolidated is intended to mean that the monolayers are firmly attached to one another. These monolayer packages can be made with different methods, for example by calendaring between rolls, or by compression moulding. Very good results are achieved if also the monolayer packages are compressed at an elevated temperature, optionally at high pressure as in the process according to the invention, and subsequently cooled under a high pressure; preferably of at least 5 MPa, even more preferably under the same pressure as during the previous step.

The invention also relates to a ballistic-resistant moulded article comprising a stack of monolayers, each monolayer containing unidirectionally oriented reinforcing fibres and at most 30 mass % of a plastic matrix material, the reinforcing fibres being highly-drawn polyethylene fibres, and with the fibre direction in each monolayer being rotated with respect to the fibre direction in an adjacent monolayer, characterized in that the plastic matrix material contains polyurethane and the moulded article has an SEA at 80° C. that is at least 100 J/(kg/m$^2$).

It has, surprisingly, been found that the moulded articles according to the invention have low acoustic damping. The acoustic damping of moulded articles with a thickness of 2 cm, measured at 0.5 MHz, is lower than 30 dB. The absorption per unit thickness therefore is less than 15 dB/cm. As a result, the moulded articles can easily be distinguished from moulded articles according to the state of the art.

EXAMPLES I-XIII

Materials Used

A monolayer package consisting of two monolayers disposed cross-wise at an angle of 90 degrees. The fibres are highly-drawn fibres of high molar mass linear polyethylene of make Dyneema® SK76 with a strength of about 36 cN/dtex, a modulus of about 1180 cN/dtex and a fineness of about 2 denier per filament with a cross-section aspect ratio of about 1. The monolayer contains 18 mass % matrix material consisting of polyurethane from Baxenden Chemicals Ltd., which polyurethane is based on polyetherdiol and aliphatic diisocyanate, and is applied as an aqueous dispersion. The 100% strain modulus of the matrix is 6 MPa, as measured on a film made from the dispersion. The areal density of the monolayer package is 130.5 g/m$^2$. In Table 1 such materials are indicated by HB25.

Procedure

Short compression cycle: 144 of the above-mentioned monolayer packages were stacked to yield a package whereupon the package in its entirety was preheated in an oven for 2.5 hours at a temperature of 125° C. The package was then compressed for 10 minutes in a press at the temperature and pressure given in Table 1. The package was subsequently cooled to a temperature of 60° C. under the same compression pressure.

Long compression cycle: 144 of the above-mentioned monolayer packages were stacked to yield a package and subsequently compressed for 65 minutes in a press at the temperature and pressure given in Table 1. The package was subsequently cooled to a temperature of 60° C. under the same compression pressure.

Test Procedures

The modulus of the matrix material was determined according to ISO 527. The 100% modulus was determined on film strips with a length of 100 mm (free length between the clamps) and a width of 24 mm. The 100% modulus is the secant modulus measured between strains of 0% and 100%.

The $V_{50}$ of the panels was measured according to a procedure derived from Stanag 2920. The panels were clamped onto a steel frame and fired at, without backing, with AK47 ammunition at 20 and 80° C. The panels were conditioned at a controlled temperature in an oven for at least 24 hours prior to the test. Immediately before the test started, the conditioned panel to be fired at was taken from the oven and attached to the frame, upon which firing took place within 2 minutes.

The method used for determination of the acoustic damping is a pulse transmission measurement technique (frequency range 0.5-10 MHz). Measuring took place at a frequency of 0.5 MHz. The panels used for determination of the acoustic damping have an areal density of about 19 kg/m² and a thickness of about 20 mm. The samples were strips having a width of about 100 mm that had been cut from (the side of) a panel.

The transmission was measured between a transmitter and a receiver at a distance of 10 cm on both sides of the sample and the acoustic coupling was realized by means of a water jet. The entire surface area of the samples was scanned, after which the average damping was determined.

Results

Table 1 presents the $V_{50}$ values and SEA values obtained as a function of the compression temperature and pressure. Time of conditioning at 80° C. was 24 hours, except for examples IV and VIII (1 week), and V (4 weeks). For some panels also acoustic damping results are given.

Comparative Experiments

The process described under the Examples was repeated at compression pressure of less than 25 MPa and a compression temperature of 125° C. The results of this Comparative Experiment A are given in Table 1.

The above process was repeated for a monolayer package consisting of four monolayers disposed cross-wise at an angle of 90 degrees. The fibres are high-drawn fibres of high molar mass linear polyethylene of make Dyneema® SK76 with a strength of about 36 cN/dtex, a modulus of 1180 cN/dtex and a fineness of 2 denier per filament with a cross-section aspect ratio of about 1. The monolayer contains about 18 mass % matrix material consisting of Kraton®, applied from an aqueous dispersion. Kraton is a styrene-isoprene-styrene triblock copolymer composition. The 100% strain modulus of this matrix is 1.4 MPa. The areal density of the monolayer package is 265 g/m². In Table 1 this material is indicated by HB2 for Comp. Exp. B-D. The areal density of these samples was about 19 kg/m², as for all others.

The results show that the SEA at 80° C. against AK47 of the moulded articles manufactured according to the process of the invention is always higher than 100 J/(kg/m²).

TABLE 1

| | Material | Compression time minutes | Compression pressure MPa | Compression temperature °C. | $V_{50}$ 20° C. m/s | SEA 20° C. J/(kg/m²) | Conditioning time at 80° C. days | $V_{50}$ 80° C. m/s | SEA 80° C. J/(kg/m²) | Damping 05. MHz dB/cm |
|---|---|---|---|---|---|---|---|---|---|---|
| I | HB25 | 10 | 30 | 125 | 833 | 148 | 1 | 776 | 128 | 14.9 |
| II | HB25 | 10 | 30 | 135 | 878 | 164 | 1 | 778 | 129 | |
| III | HB25 | 10 | 30 | 140 | 836 | 149 | 1 | 817 | 142 | |
| IV | HB25 | 10 | 30 | 140 | 780 | 129 | 7 | 776 | 128 | |
| V | HB25 | 10 | 30 | 140 | 828 | 146 | 28 | 775 | 128 | |
| VI | HB25 | 10 | 30 | 140 | 765 | 125 | 1 | 792 | 133 | 17.3 |
| VII | HB25 | 10 | 30 | 145 | | | 1 | 845 | 152 | |
| VIII | HB25 | 10 | 30 | 145 | | | 7 | 826 | 145 | |
| IX | HB25 | 65 | 30 | 125 | 813 | 141 | 1 | 773 | 127 | |
| X | HB25 | 65 | 30 | 140 | 830 | 146 | 1 | 812 | 140 | |
| A | HB25 | 10 | 16.5 | 125 | 743 | 117 | 1 | 605 | 78 | 25.5 |
| B | HB2 | 65 | 30 | 140 | 835 | 148 | 1 | <618 | <81 | >40 |
| C | HB2 | 65 | 16.5 | 125 | 848 | 153 | 1 | <631 | <85 | |
| D | HB2 | 10 | 16.5 | 125 | 807 | 139 | 1 | <631 | <85 | >40 |

The invention claimed is:

1. Process for the manufacture of ballistic-resistant moulded article comprising the steps of forming a stack of monolayers in which each monolayer contains unidirectionally oriented reinforcing fibres and at most 30 mass % of a polyurethane matrix material having a 100% modulus of at least 3 MPa, the reinforcing fibres being highly-drawn polyethylene fibres, wherein said step of forming the stack of monolayers includes rotating the fibre direction in each monolayer with respect to the fibre direction in an adjacent monolayer, and thereafter compressing the stack of monolayers at an elevated temperature between 125 and 150° C. and at a compression pressure of more than 25 MPa.

2. Process according to claim 1, wherein the step of compressing the stack of monolayers is practiced by compressing the stack for at least 60 minutes at a temperature between 125 and 135° C.

3. Process according to claim 1, wherein the step of compressing the stack of monolayers is practiced by compressing the stack for 20 minutes at a temperature between 135 and 150° C.

4. Ballistic-resistant moulded article comprising a stack of monolayers, each monolayer containing unidirectionally oriented reinforcing fibers and at most 30 mass % of a polyurethane matrix material having a 100% modulus of at least 3 MPa, the reinforcing fibres being highly-drawn polyethylene fibres, and with the fibre direction in each monolayer being rotated with respect to the fibre direction in an adjacent monolayer, wherein the moulded article has an SEA at 80° against AK47 bullets that is at least 100 J/(kg/m²).

5. Ballistic-resistant moulded article according to claim 4, with an acoustic damping, measured at 0.5 MHz, of less than 20 dB/cm.

* * * * *